US011982116B2

(12) United States Patent
Rupp et al.

(10) Patent No.: US 11,982,116 B2
(45) Date of Patent: May 14, 2024

(54) GUIDE SYSTEM FOR GUIDING A MOVABLY MOUNTED DOOR LEAF

(71) Applicant: Julius Blum GmbH, Hoechst (AT)

(72) Inventors: Matthias Rupp, Hohenweiler (AT); Lukas Kolhaupt, Lauterach (AT); Kai Hollenstein, Hoechst (AT)

(73) Assignee: Julius Blum GmbH, Hoechst (AT)

( * ) Notice: Subject to any disclaimer, the term of this patent is extended or adjusted under 35 U.S.C. 154(b) by 98 days.

(21) Appl. No.: 17/841,008

(22) Filed: Jun. 15, 2022

(65) Prior Publication Data

US 2022/0307307 A1 Sep. 29, 2022

Related U.S. Application Data

(63) Continuation of application No. PCT/AT2020/060456, filed on Dec. 11, 2020.

(30) Foreign Application Priority Data

Dec. 19, 2019 (AT) .................................. 51118/2019

(51) Int. Cl.
*E05D 15/00* (2006.01)
*E05D 15/26* (2006.01)
*E05D 15/58* (2006.01)

(52) U.S. Cl.
CPC ........... *E05D 15/58* (2013.01); *E05D 15/264* (2013.01); *E05Y 2600/53* (2013.01); *E05Y 2900/212* (2013.01)

(58) Field of Classification Search
CPC ....... E05D 15/264; E05D 15/34; E05D 15/28; E05D 15/30; E05D 15/32; E05D 15/58;
(Continued)

(56) References Cited

U.S. PATENT DOCUMENTS 8,381,354 B2 * 2/2013 Haab .................. E05D 15/0639 16/105
9,068,386 B2 6/2015 Ishii et al.
(Continued)

FOREIGN PATENT DOCUMENTS

AT 521133 11/2019
AT 521139 11/2019
(Continued)

OTHER PUBLICATIONS

Search Report issued Jul. 6, 2023 in corresponding Chinese Patent Application No. 202080088344.6.
(Continued)

*Primary Examiner* — Chuck Y Mah
(74) *Attorney, Agent, or Firm* — Wenderoth, Lind & Ponack, L.L.P.

(57) ABSTRACT

A guide system for guiding a movably-supported door wing, in particular a folding-sliding-door, relative to a stationary furniture part, includes a carrier for movably supporting the door wing, a guide rail for guiding the carrier, the guide rail being configured to be fixed to the stationary furniture part, and a guiding device for displaceably supporting the carrier along the guide rail. The running carriage being configured to be coupled to the door wing, a receiving device for receiving the running carriage, the receiving device and the carrier being configured as constructional units separate from one another and being configured to be fixed to one another. The carrier includes an interface for fixing the receiving device, the interface being configured such that the receiving device and the carrier can be fixed to one another by sliding in a sliding direction extending parallel to the guide rail.

21 Claims, 7 Drawing Sheets

(58) Field of Classification Search

CPC .... E05D 3/06; E05D 3/08; E05D 3/14; E05D 3/16; E05D 2003/166; E05D 2015/586; E06B 7/36; E06B 7/367; E05Y 2600/53; E05Y 2900/20; E05Y 2900/212

See application file for complete search history.

(56) References Cited

U.S. PATENT DOCUMENTS

| | | | | |
|---|---|---|---|---|
| 9,863,691 | B2 | 1/2018 | Kikuchi et al. | |
| 9,896,245 | B1 | 2/2018 | Sanchez | |
| 10,227,806 | B2 * | 3/2019 | Gabl | E05F 1/16 |
| 10,316,565 | B2 | 6/2019 | Gabl | |
| 10,753,133 | B2 | 8/2020 | Kohlweiss | |
| 2004/0239216 | A1 * | 12/2004 | Castillo | E05D 15/58 312/322 |
| 2014/0150208 | A1 * | 6/2014 | Haab | E05D 13/00 16/86.2 |
| 2014/0231031 | A1 * | 8/2014 | Chen | E06B 9/0638 160/405 |
| 2015/0008811 | A1 | 1/2015 | Ishii et al. | |
| 2016/0252291 | A1 | 9/2016 | Kikuchi et al. | |
| 2017/0247924 | A1 | 8/2017 | Gabl | |
| 2017/0260789 | A1 * | 9/2017 | Gabl | E06B 3/509 |
| 2018/0119470 | A1 | 5/2018 | Kohlweiss | |
| 2020/0018108 | A1 | 1/2020 | Sperger et al. | |
| 2020/0131825 | A1 | 4/2020 | Hirtsiefer | |
| 2020/0199925 | A1 * | 6/2020 | Vander Bent, Jr. | E06B 3/50 |
| 2021/0246699 | A1 | 8/2021 | Göetz | |
| 2021/0246700 | A1 | 8/2021 | Hoffmann | |
| 2021/0262269 | A1 | 8/2021 | Goetz | |

FOREIGN PATENT DOCUMENTS

| | | |
|---|---|---|
| AT | 521260 | 12/2019 |
| CN | 107735542 | 2/2018 |
| CN | 108868417 | 11/2018 |
| EP | 2 775 079 | 9/2014 |
| JP | 2004-116267 | 4/2004 |
| JP | WO2013/114730 | 8/2013 |
| JP | 2022-507438 | 1/2022 |
| JP | 2022-507440 | 1/2022 |
| TW | 201723295 | 7/2017 |
| WO | 2016/081960 | 6/2016 |
| WO | 2018/204947 | 11/2018 |

OTHER PUBLICATIONS

International Search Report issued Mar. 17, 2021 in International (PCT) Application No. PCT/AT2020/060456.

* cited by examiner

GUIDE SYSTEM FOR GUIDING A MOVABLY MOUNTED DOOR LEAF

BACKGROUND OF THE INVENTION

The present invention relates to a guide system for guiding at least one movably-supported door wing, in particular a folding-sliding-door, relative to a stationary furniture part, the guide system comprising:

- at least one carrier for movably supporting the at least one door wing,
- at least one guide rail for guiding the at least one carrier, the at least one guide rail to be fixed to the stationary furniture part,
- at least one guiding device for displaceably supporting the at least one carrier along the guide rail,
- at least one running carriage to be coupled to the at least one door wing, and
- at least one receiving device for receiving the at least one running carriage, the at least one receiving device and the at least one carrier being configured as constructional units separate from one another and being configured to be fixed to one another.

Moreover, the invention concerns an item of furniture comprising a stationary furniture part and at least two furniture parts movable relative to the stationary furniture part, and the at least two furniture parts are movable relative to the stationary furniture part by a guide system of the type to be described.

Moreover, the invention relates to a method for mounting a guide system of the type to be described.

AT 521133 B1 discloses a guide system. The receiving device for receiving the running carriage and the carrier displaceable in a depth direction of the furniture carcass are configured as constructional units which are separate from one another and which are configured to be fixed to one another. In a mounted condition, the receiving device and the carrier are movably supported relative to one another in a longitudinal direction of the carrier. Therefore, these components can be decoupled from one another from a load of the respective other component. For mounting the receiving device, the receiving device must be slid in a longitudinal direction onto the carrier which to be pre-mounted to the item of furniture, until a protrusion arranged on the carrier engages into a recess arranged on the receiving device (see FIG. 6a of the AT 521133 B1 reference). The mounting procedure of the receiving device on the carrier can be relatively elaborate, in particular when the carrier has a considerable length and due to a restricted accessibility.

SUMMARY OF THE INVENTION

It is an object of the present invention to propose a guide system of the type mentioned in the introductory part, thereby avoiding the above-discussed drawbacks and facilitating the mounting procedure of the receiving device on the carrier.

According to the invention, the at least one carrier includes an interface for fixing the at least one receiving device, the interface being configured such that the at least one receiving device and the at least one carrier can be fixed to one another by sliding in a sliding direction extending parallel to the at least one guide rail.

In other words, the receiving device can be connected to the carrier by a movement in a direction extending transverse, preferably at a right angle, to a longitudinal direction of the carrier, so that the receiving device can be slid or snapped-on, for example from the front, to the carrier pre-mounted to the furniture carcass.

This facilitates the mounting procedure insofar, because the receiving device needs not to be positioned onto the carrier from above, especially because a relatively large ceiling height has to be provided for that purpose. With the invention, on the contrary, the receiving device can be connected to the carrier by a substantially horizontally extending sliding movement, without the need that the carrier must be positioned onto the carrier from above.

For securing the receiving device on the carrier, at least one locking device can be provided. The receiving device can be, preferably releasably, locked to the carrier by the at least one locking device.

The interface can include at least one guide for guiding the at least one receiving device. Preferably, the at least one guide is configured substantially U-shaped in a cross-sectional plane extending perpendicular to a longitudinal extension of the at least one carrier. This allows a precise linear movement of the receiving device when the receiving device, for mounting purposes, is slid onto the carrier in the sliding direction.

The interface can include at least one abutment configured to limit the sliding movement of the at least one receiving device.

According to an embodiment, at least one clearance compensating element can be provided, the at least one clearance compensating element being configured to compensate for a clearance between the at least one receiving device and the at least one carrier in a direction extending parallel to the at least one guide rail. Preferably, the at least one clearance compensating element can be arranged on the at least one receiving device. It can be particularly preferred that at least two clearance compensating elements are arranged on mutually opposing sides of the at least one receiving device.

According to an embodiment, at least one mounting portion for mounting the at least one door wing on the at least one carrier is provided. The at least one mounting portion includes at least one counter-abutment configured to block the at least one receiving device in a direction opposite the sliding direction. Preferably the at least one mounting portion includes at least two hinges for movably supporting the at least one door wing.

The item of furniture according to the invention includes a stationary furniture part and at least two door wings movable relative to the stationary furniture part, and the at least two door wings can be guided relative to the stationary furniture part by a guide system of the described type.

BRIEF DESCRIPTION OF THE DRAWINGS

Further details and advantages of the present invention result from the following description of figures.

DETAILED DESCRIPTION OF THE INVENTION

Figure 1A:
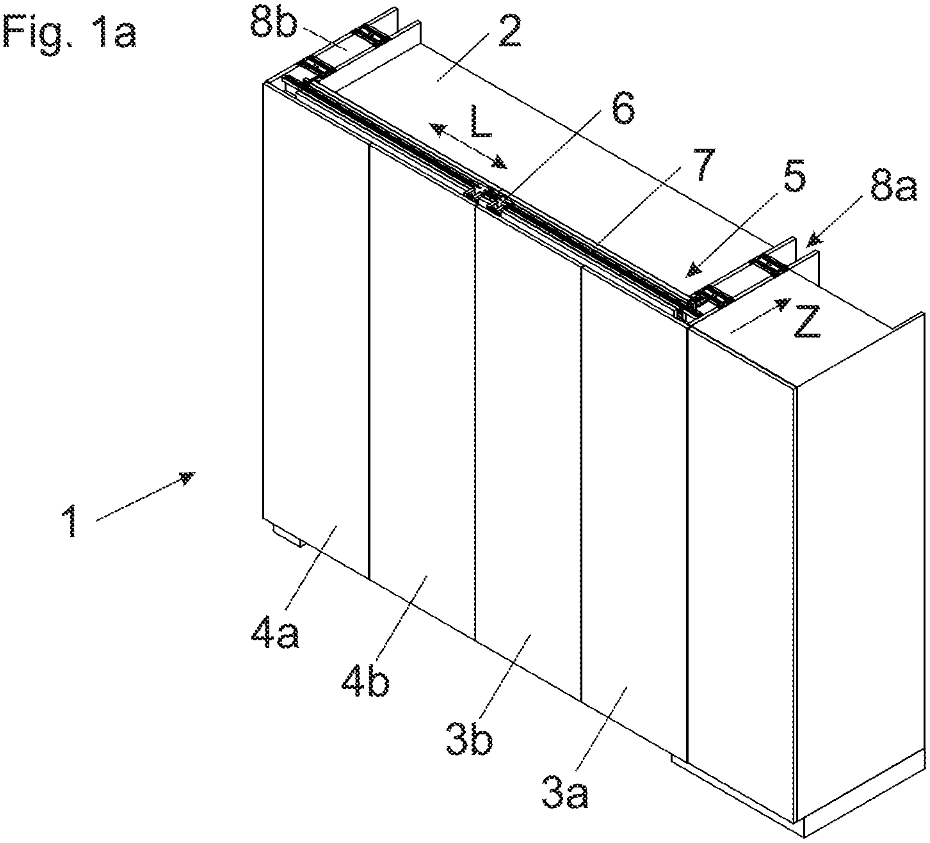
FIG. 1a, 1b are perspective views of an item of furniture comprising a furniture carcass and furniture parts movable relative thereto.

FIG. 1*a* shows a perspective view of an item of furniture 1 comprising a furniture carcass 2 and a folding-sliding-door having movable door wings 3*a*, 3*b*; 4*a*, 4*b*. The door wings 3*a*, 3*b* and the door wings 4*a*, 4*b* are movably supported by a guide system 5 between a first position, in which the door wings 3*a*, 3*b*; 4*a*, 4*b* are aligned substantially coplanar to one another, and a second position, in which the door wings 3*a*, 3*b*; 4*a*, 4*b* are aligned substantially parallel to one another. In the second (parallel) position, the door wings 3*a*, 3*b* can be inserted into a lateral receiving compartment 8*a* of the furniture carcass 2, whereas the door wings 4*a*, 4*b*, in a parallel position to one another, can be received within a further receiving compartment 8*b*. The functionality will be explained with the aid of the door wings 3*a*, 3*b*, and the same explanations apply to the other door wings 4*a*, 4*b*. The guide system 5 includes a longitudinal rail 7 having a longitudinal direction (L), and a running carriage 6 configured to be coupled to the second door wing 3*b* is displaceably supported along the longitudinal rail 7. In a mounted condition, the longitudinal rail 7 is aligned substantially horizontally and parallel to a front edge of the furniture carcass 2.

Figure 1B:
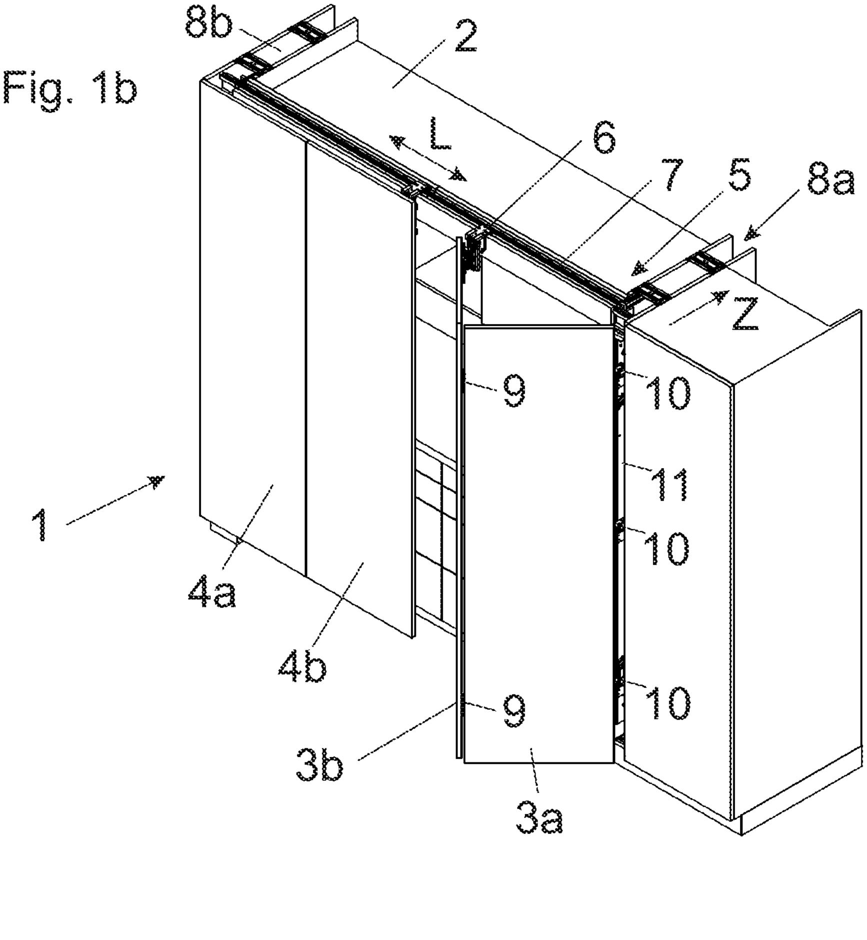

FIG. 1*b* shows the item of furniture 1, in which the door wings 3*a*, 3*b* have been moved from the coplanar position shown in FIG. 1*a* into an angled position to one another. The first door wing 3*a* can be movably supported, for example, by two or more hinges 10 on a carrier 11, the carrier 11 being insertable into the receiving compartment 8*a* in a depth direction (Z). In the shown figure, the carrier 11 is located in a transfer position, so that the running carriage 6 can be transferred to and from between the longitudinal rail 7 and the carrier 11.

In the shown transfer position, the carrier 11 is releasably locked to the longitudinal rail 7, and the locking between the longitudinal rail 7 and the carrier 11 can be released by an entry of the running carriage 6 in or onto the carrier 11. The carrier 11 can be in the form of a longitudinal column, the length of which corresponding to at least half of a height of the door wings 3*a*, 3*b*. The two door wings 3*a*, 3*b* are hingedly connected to one another about a vertically extending axis by at least one hinge fitting 9. The second door wing 3*b* is displaceably supported along the longitudinal rail 7 via the running carriage 6.

Figure 2A:
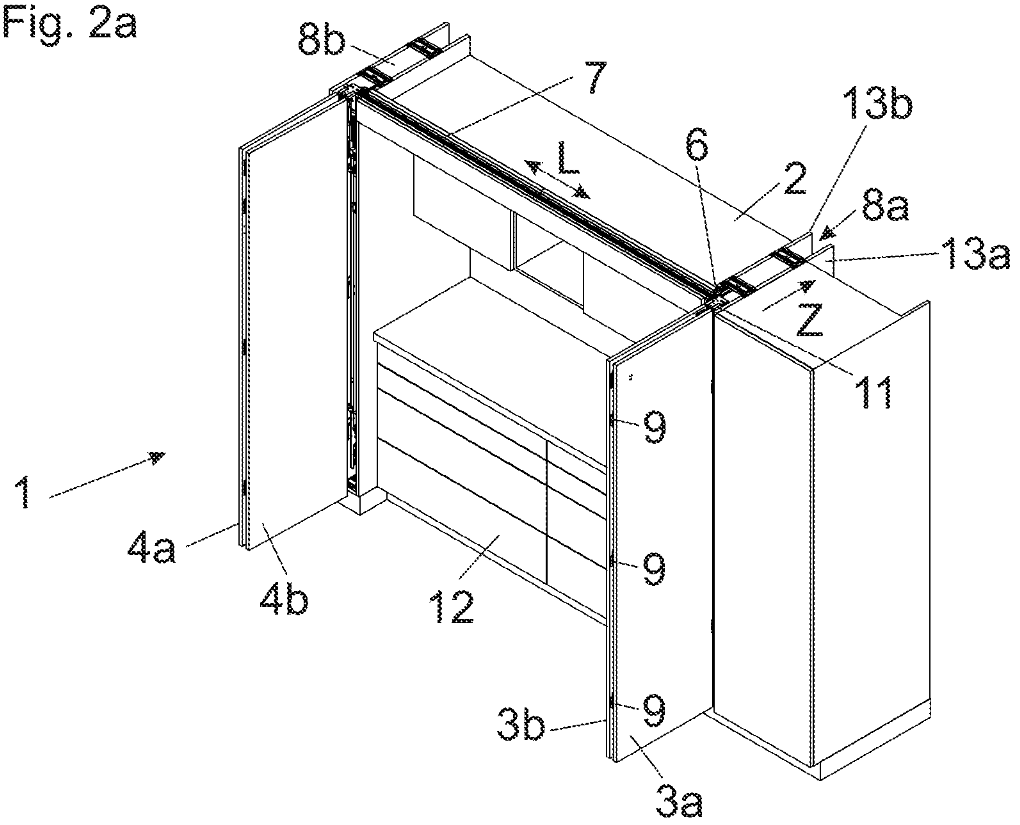
FIG. 2a, 2b show the item of furniture according to FIGS. 1a, 1b in further positions of the furniture parts to one another.

FIG. 2*a* shows the item of furniture 1 with the door wings 3*a*, 3*b* which are now aligned parallel to one another. The carrier 11 has been unlocked from the longitudinal rail 7 by an entry of the running carriage 6, so that the carrier 11 (jointly with the running carriage 6 and the door wings 3*a*, 3*b*) can be inserted into the receiving compartment 8*a* in the depth direction (Z) along at least one guide rail 17, 18 (FIG. 3) of the guide system 5. The at least one guide rail 17, 18 extends transverse to the longitudinal direction (L) of the longitudinal rail 7.

Figure 2B:
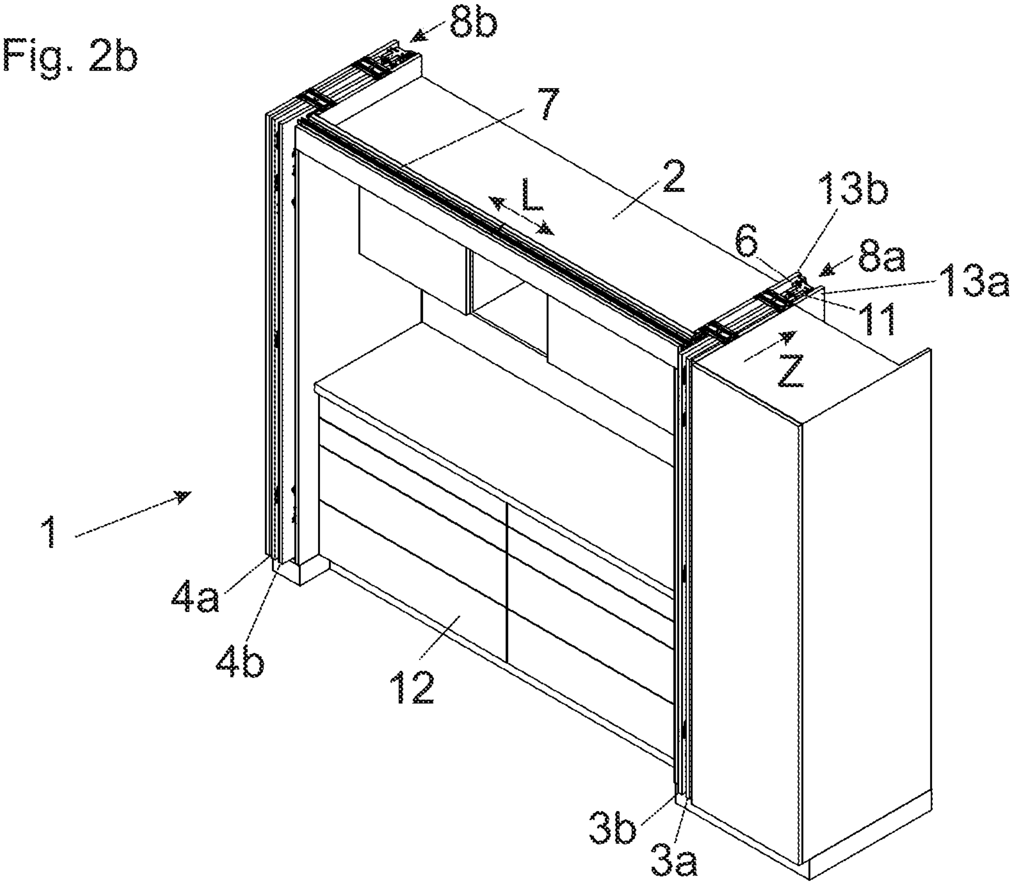

FIG. 2*b* shows the item of furniture 1 with the door wings 3*a*, 3*b* which are now located in a fully inserted condition within the receiving compartment 8*a*. The door wings 3*a*, 3*b* are thus movably supported by the guide system 5 from a first position according to FIG. 1*a*, in which the door wings 3*a*, 3*b* are aligned substantially coplanar to one another, into a second position according to FIG. 2*b*, in which the door wings 3*a*, 3*b* are aligned substantially parallel to one another and in which the door wings 3*a*, 3*b* can be received within the receiving compartment 8*a*. In this way, for example, a kitchen 12 as shown in FIGS. 2*a*, 2*b* can be entirely covered so as to visually separate the kitchen 12 from a remaining area of a living room. In the shown embodiment, the receiving compartment 8*a* is formed by a sidewall 13*a* and by a stationary furniture part 13*b* mutually spaced from the sidewall 13*a* in a parallel relationship. The door wings 3*a*, 3*b*, in parallel position to one another, can be inserted between the sidewall 13*a* and the stationary furniture part 13*b*.

Figure 3:
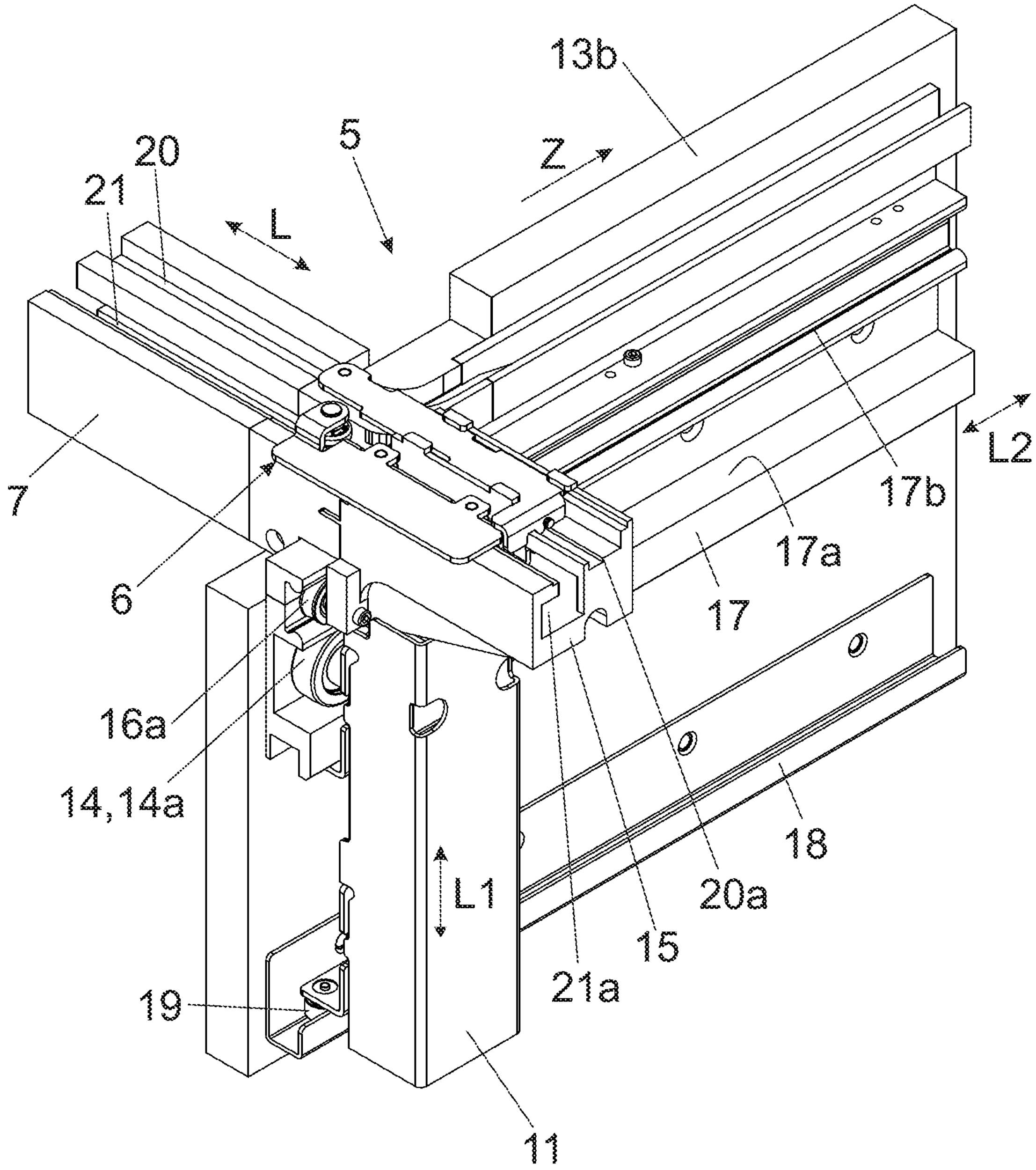
FIG. 3 shows the guide system in a perspective view, in which the receiving device is releasably locked to the longitudinal rail.

FIG. 3 shows a perspective view of the guide system 5 in region of the sidewall 13*a* and the stationary furniture part 13*b* between which the receiving compartment 8*a* for receiving the door wings 3*a*, 3*b* is formed. The longitudinal rail 7 has a longitudinal direction (L) extending parallel to a front edge of the furniture carcass 2 in a mounted position. A guide rail 17 having a longitudinal direction (L2) is fixed to the stationary furniture part 13*b*, and the longitudinal direction (L) of the longitudinal rail 7 and the longitudinal direction (L2) of the guide rail 17 extend transverse, preferably substantially at a right angle, to one another.

The carrier 11 is configured for movably supporting the door wing 3*a*, and the door wing 3*a* can be pivotally supported, for example, via two or more hinges 10 (FIG. 1*b*) on the carrier 11 about a vertically extending axis in the mounted position. The carrier 11 includes at least one guiding device 14 for moving the carrier 11 along the guide rail 17 in the depth direction (Z) and in a direction opposite the depth direction (Z). In the shown figure, the guiding device 14 of the carrier 11 includes at least one running wheel 14*a* movably supported along a first running limb 17*a* of the guide rail 17.

The carrier 11 is configured to be releasably locked to the longitudinal rail 7 via a receiving device 15. The receiving device 15 is configured to receive the running carriage 6, and the running carriage 6 is configured to run between the longitudinal rail 7 and the receiving device 15. For this purpose, guide grooves 20, 21 may be arranged in the longitudinal rail 7, the guide grooves 20, 21 being aligned flush with corresponding guide grooves 20*a*, 21*a* of the receiving device 15 in the transfer position of the receiving device 15. In this way, the running wheels 6*a* of the running carriage 6 can be displaced between the longitudinal rail 7 and the receiving device 15 without a disturbing abutting edge.

The receiving device 15 is configured to be movably supported relative to the carrier 11 in the longitudinal extension (L1) of the carrier 11. In this way, the receiving device 15 and the carrier 11 can be displaced relative to one another in the longitudinal extension (L1) of the carrier 11, so that the receiving device 15 can be decoupled from undesired torsional movements or sagging movements of the carrier 11 when a mechanical force is exerted to the carrier 11 (for example caused by a force of the door wing 3*a* or due to an adjustment device for adjusting a position of the door wing 3*a*). As a result, the guide grooves 20, 21 of the longitudinal rail 7 and the guide grooves 20*a*, 21*a* of the receiving device 15, in the transfer position, always remain aligned flush to one another upon a sagging movement or upon a torsional movement of the carrier 11. As a result, a precise displacement of the running carriage 6 between the longitudinal rail 7 and the receiving device 15 can be guaranteed.

For an improved decoupling between the receiving device 15 and the carrier 11, the receiving device 15 includes at least one supporting roller 16*a* separate from the guiding device 14 of the carrier 11, and the at least one supporting roller 16*a* is movably supported along the guide rail 17. It can be preferably provided that the guide rail 17 includes a first running limb 17*a* and at least one second running limb 17*b* separate from the first running limb 17*a*, and the running wheel 14*a* of the guiding device 14 is movably supported along the first running limb 17*a* of the guide rail 17, and the at least one supporting roller 16*a* of the receiving device 15 is movably supported along the second running limb 17*b* of the guide rail 17.

The carrier 11 and the receiving device 15 are connected in a motionally-coupled manner to one another upon a movement along the guide rail 17 in the depth direction (Z). Preferably, the receiving device 15 and the carrier 11, upon a movement along the guide rail 17 in the depth direction (Z) and upon a movement in a direction opposite the depth direction (Z), are coupled to one another without clearance. For improving the support of the carrier 11, at least one further guide rail 18 may be provided, and a further running wheel 19 of the carrier 11 is displaceably supported along the further guide rail 18.

Figure 4A:
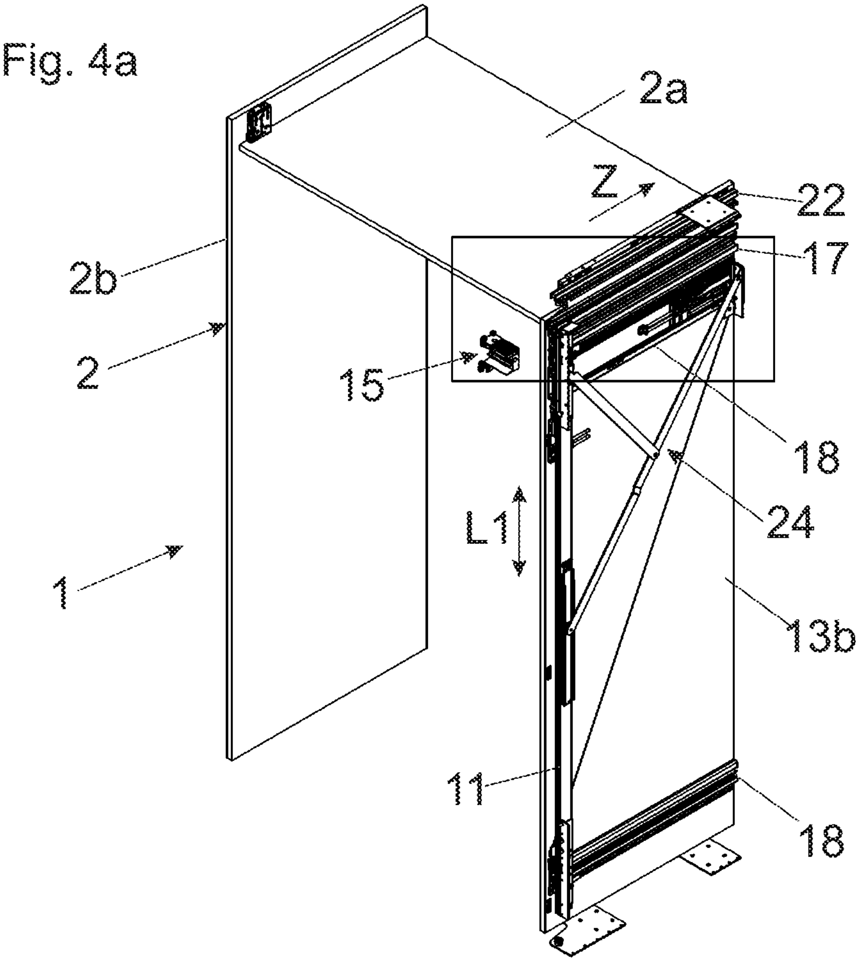
FIG. 4a, 4b show the item of furniture with the guide rails fixed to the stationary furniture part, and an enlarged detail view thereof.

FIG. 4*a* shows the item of furniture 1 with the furniture carcass 2, the furniture carcass 2 comprising the stationary furniture part 13*b*, a cover plate 2*a* and a sidewall 2*b*. At least one, preferably two or more, guide rails 17, 18 for displaceably supporting the carrier 11 is or are fixed to the stationary furniture part 13*b*. The carrier 11 and the receiving device 15 for the running carriage 6 are configured as constructional units which are separate from one another and which are configured to be fixed to one another.

In the shown embodiment, at least one further guide rail 22 for guiding the receiving device 15 is provided, the at least one further guide rail 22 being arranged in a parallel relationship to the guide rails 17, 18 for guiding the carrier 11. The vertically extending, lengthy carrier 11 is movable along the guide rails 17, 18 by a scissor mechanism 24.

Figure 4B:
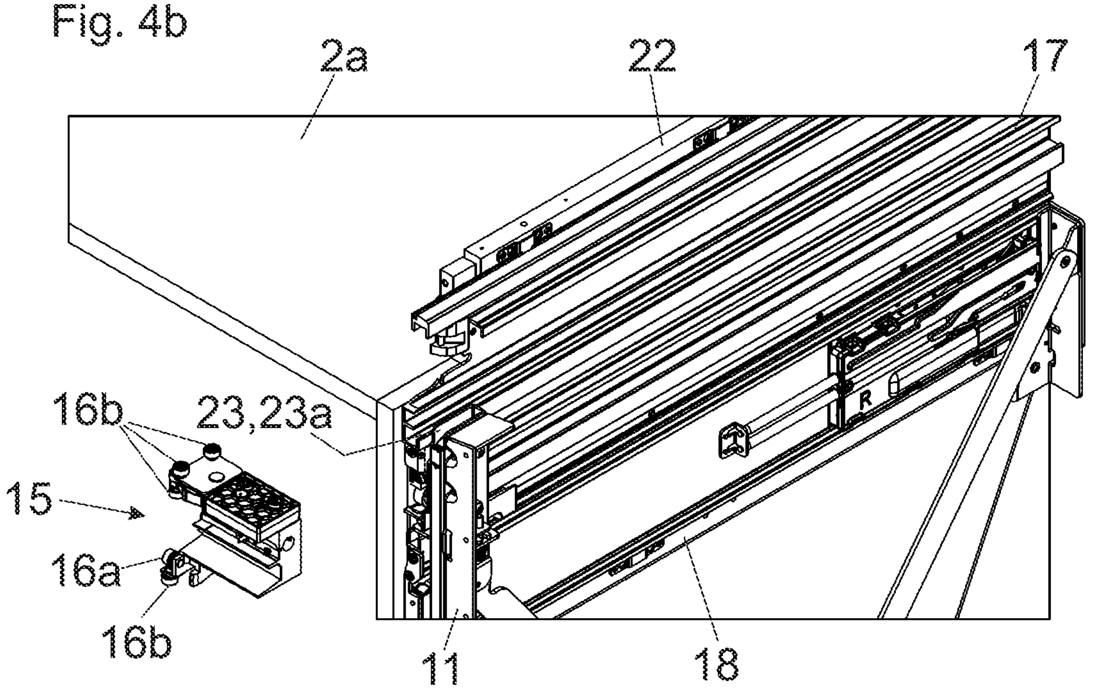

FIG. 4*b* shows the framed region of FIG. 4*a* in an enlarged view. The carrier 11 includes an interface (mounting member) 23 to allow the receiving device 15 to be fixed (mounted) to the carrier. The interface (mounting member) 23 is configured such that the receiving device 15 and the carrier 11 are fixable to one another by sliding the receiving device 15 in a sliding direction (SR), thus in the depth direction (Z), extending parallel to the at least one guide rail 17, 18. The interface 23 can include at least one guide 23*a* for guiding the receiving device 15. The guide 23*a*, in a cross-sectional plane extending perpendicular to the longitudinal extension (L1) of the carrier 11, can be configured substantially U-shaped. The interface 23 includes at least one abutment 25 configured to limit a movement of the receiving device 15 onto the carrier 11 in the sliding direction (SR).

The receiving device 15 can include a plurality of supporting rollers 16*a*, 16*b*. The supporting rollers 16*a*, in a mounted condition of the receiving device 15, are rotatable about a horizontally extending axis and the supporting rollers 16*b* are rotatable about a vertically extending axis.

Figure 5A:
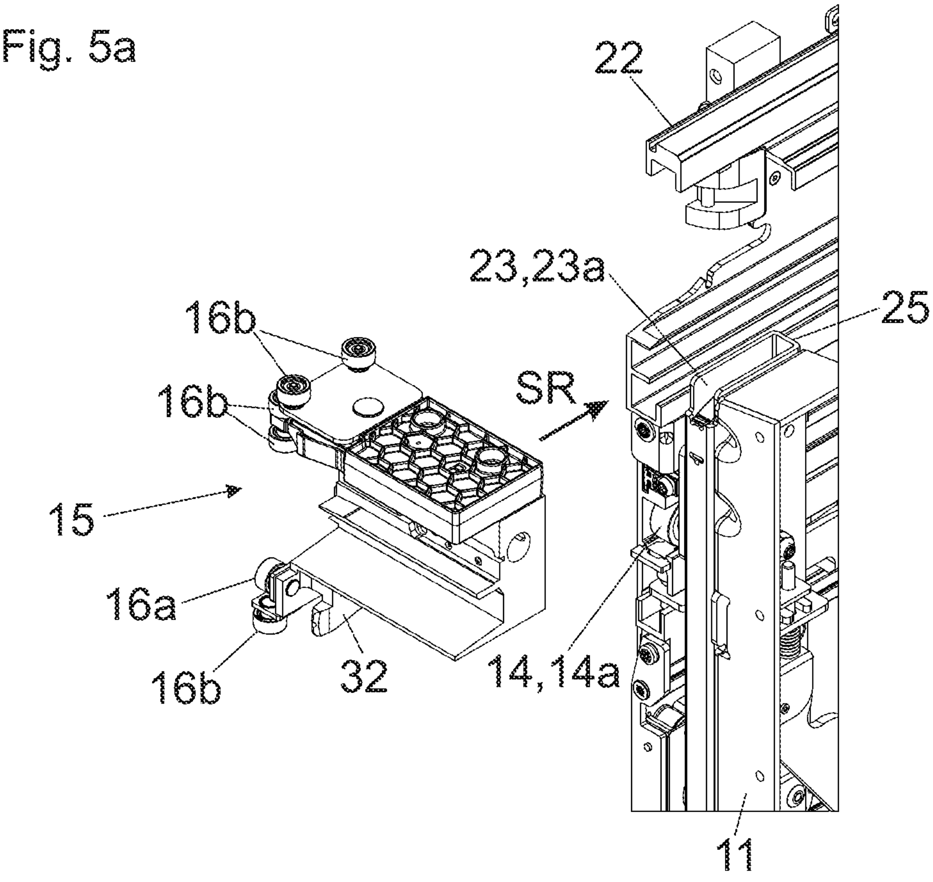
FIG. 5*a*, 5*b* show the receiving device configured to be fixed to the carrier in a perspective view, and the receiving device fixed to the carrier in a cross-sectional view.

FIG. 5*a* shows the receiving device 15 configured to be fixed to the carrier 11. The carrier 11 has already been pre-mounted to the guide rail 17 via the guiding device 14 having the running wheel 14*a*. The interface 23 of the carrier 11 can be seen, the carrier 11 having the U-shaped guide 23*a* for sliding the receiving device 15 onto the carrier 11. A movement of the receiving device 15 in the sliding direction (SR) can be limited by the abutment 25. The guiding device 15 with the running wheels 16*a*, 16*b* is displaceably supported along a further guide rail 22 separate from the guide rails 17, 18.

Preferably, the receiving device 15 includes at least one guiding portion 32 configured to be moved along the guide 23*a* of the interface 23 upon sliding the guiding device 15 in the sliding direction (SR).

Figure 5B:
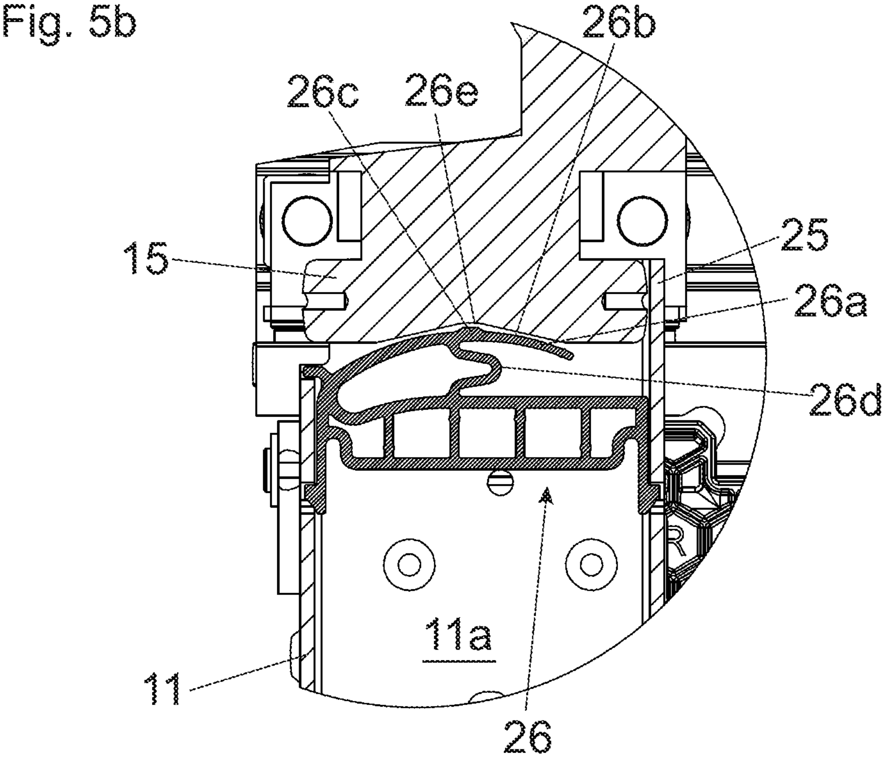

FIG. 5*b* shows the fixed condition of the receiving device 15 on the carrier 11 in a cross-sectional view. The receiving device 15 can be, preferably releasably, secured or locked to the carrier 11 by a locking device 26. The locking device 26

- can include at least one lever arm 26*a*, and it can be preferably provided that the at least one lever arm 26*a* includes a curved bearing surface 26*b* and/or at least one locking element 26*c*, and/or
- can include at least one spring element 26*d*, and it can be preferably provided that the at least one spring element 26*d* is formed by a material elasticity of a plastic portion, and/or
- can be at least partially arranged in a cavity 11*a* of the at least one carrier 11, and/or
- can include at least one pivotable lever arm 26*a* pressurized by a force of at least one spring element 26*d*, the lever arm 26*a* being pivotable against the force of the at least one spring element 26*d* upon the sliding operation the at least one receiving device 15, and/or
- can include at least one lever arm 26*a* and/or at least one locking element 26*c*, and at least one recess 26*e* is provided for receiving the at least one lever arm 26*a* and/or the at least one locking element 26*c*, and it can be preferably provided that the at least one lever arm 26*a* and/or the at least one locking element 26*c* are arranged on the at least one carrier 11 and the at least one recess 26*e* is arranged on the at least one receiving device 15.

Figure 6A:
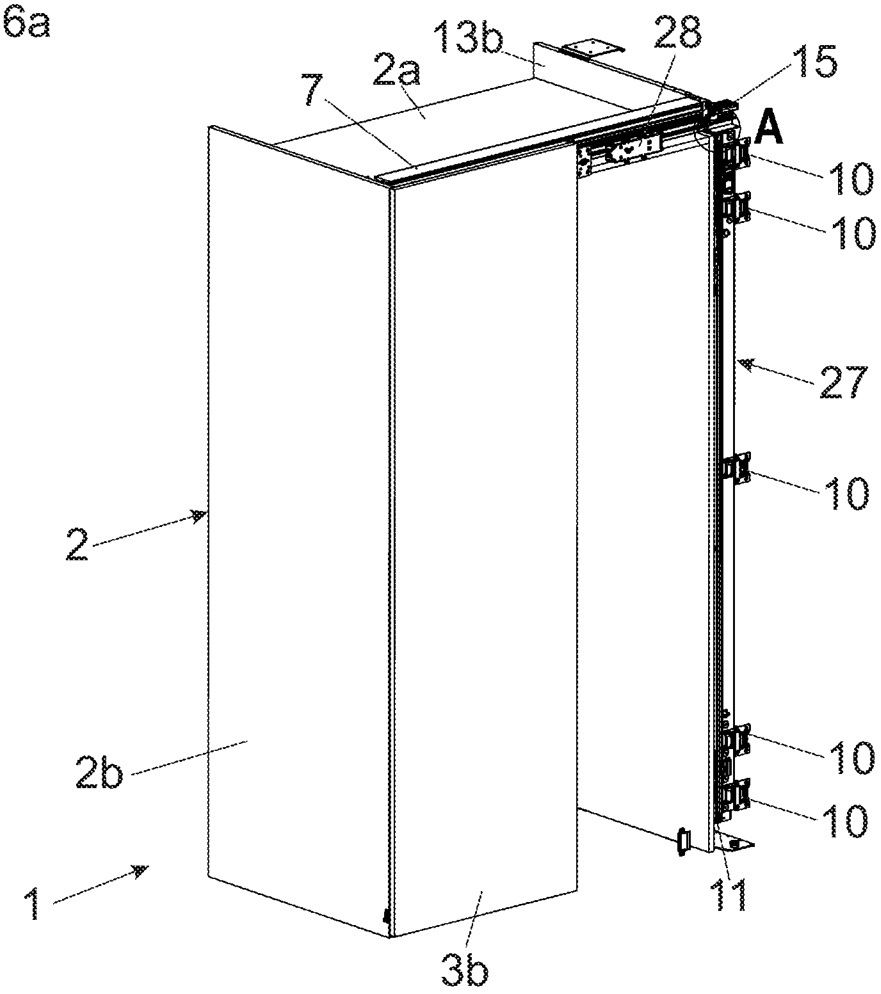
FIG. 6*a*, 6*b* show an item of furniture with a hidden door wing configured to be fixed to the carrier via a mounting portion separate from the carrier, and an enlarged detail view thereof.

FIG. 6*a* shows the item of furniture 1 with the furniture carcass 2 in a perspective view. The second door wing 3*b* is located in a position in which the furniture carcass 2 is covered and the first door wing 3*a* is hidden for the sake of improved overview. By an ejection device 28, preferably comprising a Touch-Latch function, the door wings 3*a*, 3*b* can be ejected from a coplanar position into an angled position to one another.

In the shown embodiment, a mounting portion 27 separate from the carrier 11 is provided. At least two hinges 10 for moving the first door wing 3*a* are arranged or are configured to be arranged on the mounting portion 27. The mounting portion 27 has a height substantially corresponding to a height of the carrier 11. The mounting portion 27 is configured to be connected to the carrier 11 via at least one fastening device 29.

It can be preferably provided that that in a first step, all hinges 10 provided for moving the door wing 3*a* are jointly pre-mounted to the mounting portion 27. In a second step, the hinges 10 pre-mounted to the mounting portion 27 are to be connected to the first door wing 3*a*. In a third step, the mounting portion 27 fixed to the first door wing 3*a* is to be connected to the carrier 11 via the at least one fastening device 29.

Moreover, the mounting portion 27 fulfils a further function, namely that the mounting portion 27 forms at least one counter-abutment 30 (FIG. 6*b*) configured to block a movement of the receiving device 15 in a direction opposite the sliding direction (SR). In a mounted condition of the receiving device 15 on the carrier 11, the receiving device 15 is thus received between the abutment 25 of the interface 23 and the mounting portion 27. As a result, a movement of the receiving device 15 within the interface 23 can be prevented or largely restrained.

Figure 6B:
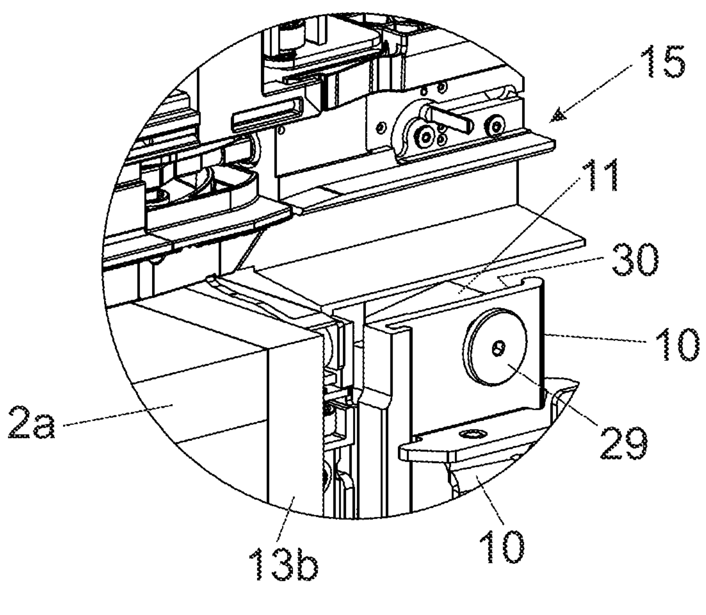

FIG. 6*b* shows the encircled region "A" of FIG. 6*a* in an enlarged view. The counter-abutment 30 of the mounting portion 27 can be seen, and a movement of the receiving device 15 in a direction opposite the sliding direction (SR) can be prevented by the counter-abutment 30.

Figure 7A:
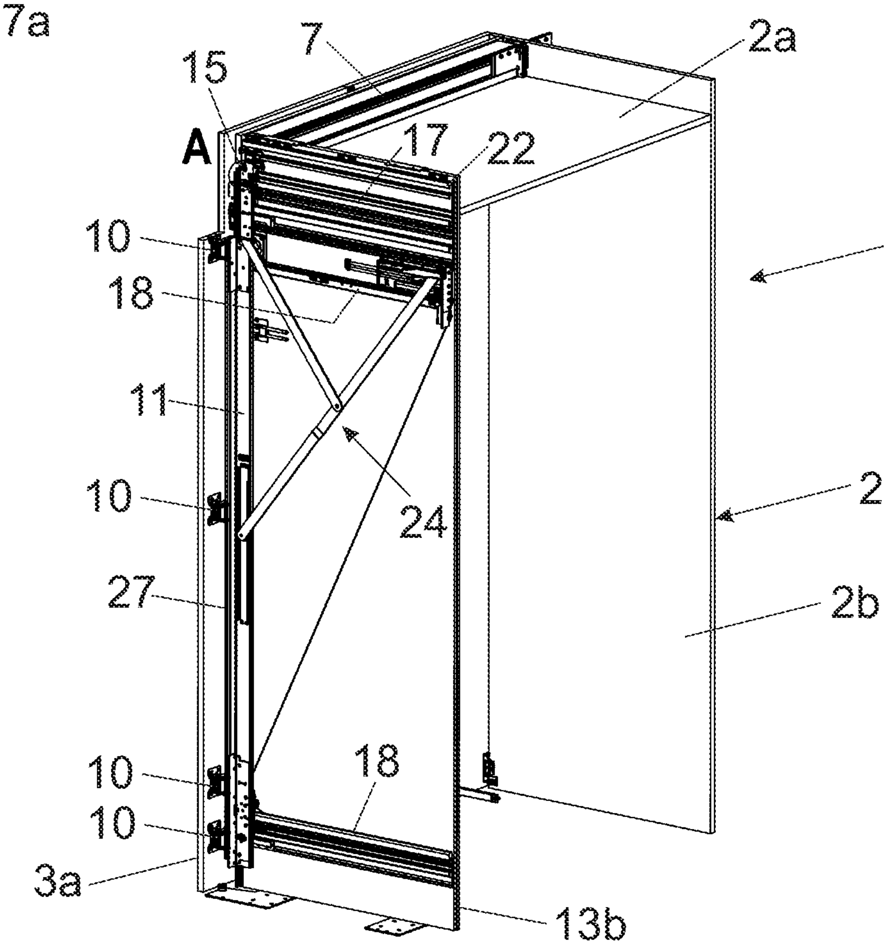
FIG. 7*a*, 7*b* show the item of furniture according to FIGS. 6*a*, 6*b* in a view from the rear, and an enlarged detail view thereof.

FIG. 7*a* shows the item of furniture 1 with the furniture carcass 2 in a view from the rear. The first door wing 3*a* is hingedly connected to the carrier 11 via the hinges 10 which are to be fixed to the mounting portion 27. The longitudinal rail 7 for guiding the door wings 3*a*, 3*b* is arranged on the top plate 2*a* of the furniture carcass 2. The guide rails 17, 18 for displaceably supporting the carrier 11 and the further guide rail 22 separate from the guide rails 17, 18 are fixed to the stationary furniture part 13*b*. By the scissor mechanism 24, the carrier 11 is movable along the guide rails 17, 18 in a horizontal direction.

Figure 7B:
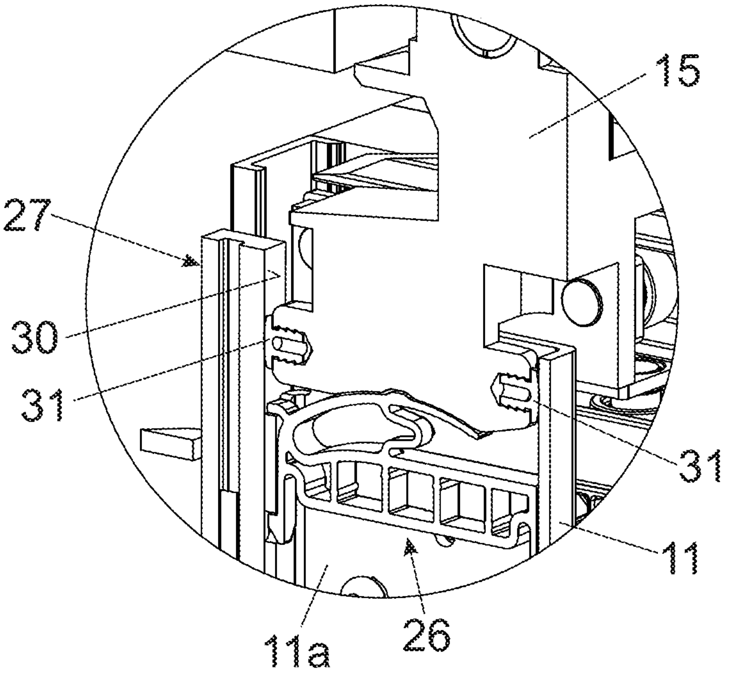

FIG. 7*b* shows the encircled region "A" of FIG. 7*a* in an enlarged cross-sectional view, in which the receiving device 15 secured by the locking device 26 can be seen. For reducing a possibly occurring clearance of the receiving device 15 in its mounted condition, at least one clearance compensating element 31 can be provided. By the clearance compensating element 31, a clearance between the at least one receiving device 15 and the at least one carrier 11 in a direction extending parallel to the at least one guide rail 17, 18 can be compensated for. Thereby, it can be provided that the at least one clearance compensating element 31 is arranged on the at least one receiving device 15. In the shown embodiment, at least two clearance compensating elements 31 are arranged on mutually opposing sides of the receiving device 15.

The at least one clearance compensating element 31 can be configured as a spring buffer, and the spring buffer can include a compressible or an elastically deformable plastic material. Alternatively, the clearance compensating element 31 can also include a bearing member pressurized by a force storage member. By the bearing member, a clearance between the receiving device 15 and the carrier 11 can be compensated for.

The method for mounting at least one guide system 5 is characterized by the following, preferably in the indicated order chronologically performed, method steps:

- the guide rail 17, 18 provided for guiding the at least one carrier 11 is fixed to the stationary furniture part 13*b,*
- the at least one carrier 11 is displaceably supported on the at least one guide rail 17, 18 via the at least one guiding device 14,
- the at least one running carriage 6 is coupled to the at least one door wing 3*a*, 3*b*, and
- the at least one receiving device 15 for receiving the at least one running carriage 6 and the at least one carrier 11 are fixed to one another by sliding in a sliding direction (SR) in a direction extending parallel to the at least one guide rail 17, 18.

According to a further embodiment of the method, it can be provided that the at least one guide system 5 includes at least one locking device 26, and that the at least one receiving device 15 can be, preferably releasably, locked upon sliding onto the at least one carrier 11. It can be preferably provided that the at least one locking device 26 includes at least one pivotable lever arm 26*a* pressurized by a force of at least one spring element 26*d*. The at least one lever arm 26*a* can be pivoted against the force of the at least one spring element 26*d* upon sliding the at least one receiving device 15 onto the carrier 11.

Further, when carrying out the method, it can be provided that the at least one guide system 5 includes at least one mounting portion 27 for mounting the at least one door wing 3*a*, 3*b* to the at least one carrier 11. The at least one mounting portion 27 includes at least one counter-abutment 30 configured to block the at least one receiving device 15 in a direction opposite the sliding direction (SR). The at least one mounting portion 27 can be mounted to the at least one carrier 11 after the sliding operation of at least one receiving device 15. The at least one counter-abutment 30 of the at least one mounting portion 27 blocks the at least one receiving device 15 in a direction opposite the sliding direction (SR). Moreover, when carrying out the method, it can be provided that the at least one guide system 5 includes at least one longitudinal rail 7 for displaceably supporting the at least one running carriage 6. The at least one longitudinal rail 7, in a further method step, preferably before the sliding operation of the at least one receiving device 15, is arranged transversely to the at least one guide rail 17, 18 for guiding the at least one carrier 11.

The invention claimed is:

1. A guide system for guiding a movably-supported door wing relative to a stationary furniture part, the guide system comprising:

- a carrier for movably supporting the door wing,
- a guide rail for guiding the at least one carrier, the at least one guide rail being configured to be fixed to the stationary furniture part and configured to guide the carrier,
- a guiding device for displaceably supporting the at least one carrier along the guide rail,
- a running carriage configured to be coupled to the door wing,
- a receiving device for receiving the at least one running carriage, the receiving device and the carrier being configured as constructional units separate from one another and being fixable to one another,
- wherein the carrier includes a mounting member configured to allow the receiving device to be mounted thereto, the mounting member being configured such that the receiving device and the carrier can be fixed to one another by sliding the receiving device onto the mounting member in a sliding direction extending parallel to the guide rail.

2. The guide system according to claim 1, further comprising a locking device configured to lock the receiving device to the carrier.

3. The guide system according to claim 2, wherein the locking device is configured to releasably lock the receiving device to the carrier.

4. The guide system according to claim 2, wherein the at least one locking device:

- includes a first lever arm, and/or
- includes a spring element, and/or
- is at least partially arranged in a cavity of the at least one carrier, and/or
- includes a pivotable second lever arm pressurized by a force of a spring element, the pivotable second lever arm being pivotable against a force of the spring element upon the sliding operation of the receiving device, and/or includes a third lever arm and/or a locking element, wherein the guide system further comprises a recess for receiving the lever arm and/or for receiving the locking element.

5. The guide system according to claim 4, wherein the lever arm includes a curved bearing surface and/or at least one locking element, the spring element is formed by a material elasticity of a plastic portion, and the lever arm and/or the locking element are arranged on the carrier.

6. The guide system according to claim 1, wherein the mounting member includes a guide for guiding the receiving device.

7. The guide system according to claim 6, wherein the guide, in a cross-sectional plane extending perpendicular to a longitudinal axis of the carrier, is U-shaped.

8. The guide system according to claim 1, wherein the mounting member includes an abutment configured to limit a sliding movement of the receiving device.

9. The guide system according to claim 1, further comprising a clearance compensating element for compensating for a clearance between the receiving device and the carrier in a direction extending parallel to the guide rail, the clearance compensating element being arranged on the receiving device.

10. The guide system according to claim 9, wherein the clearance compensating element is one of at least two clearance compensating elements arranged on opposing sides of the receiving device.

11. The guide system according to claim 1, further comprising a mounting portion for mounting the door wing to the carrier, the mounting portion including a counter-abutment configured to block the receiving device in a direction opposite the sliding direction.

12. The guide system according to claim 11, wherein the mounting portion includes at least two hinges for movably supporting the door wing.

13. The guide system according to claim 1, wherein the receiving device is movably supported relative to the carrier so that the receiving device is movable along a longitudinal axis of the carrier.

14. The guide system according to claim 1, wherein the guide rail is a first guide rail, further comprising a second guide rail is provided for guiding the receiving device, the second guide rail being arranged parallel to the first guide rail for guiding the carrier.

15. The guide system according to claim 1, further comprising a longitudinal rail for displaceably supporting the running carriage, wherein the longitudinal rail is to be arranged in a direction extending transverse to the guide rail for guiding the carrier.

16. An item of furniture comprising:

a stationary furniture part;

at least two door wings movable relative to the stationary furniture part; and the guide system according to claim 1 for guiding the at least two door wings relative to the stationary furniture part.

17. The item of furniture according to claim 16, wherein the at least two door wings are movably supported by the guide system between a first position, in which the at least two door wings are aligned substantially coplanar to one another, and a second position, in which the at least two door wings are aligned substantially parallel to one another.

18. A method for mounting the guide system according to claim 1, the method comprising:

fixing the guide rail to the stationary furniture part, displaceably supporting the carrier on the guide rail via the at least one guiding device, coupling the running carriage to the door wing, and fixing the receiving device and the carrier to one another by sliding the receiving device in a sliding direction extending parallel to the guide rail.

19. The method according to claim 18, wherein the guide system further includes a locking device, and the receiving device is locked upon sliding onto the at least one carrier, wherein the locking device includes a pivotable lever arm pressurized by a force of a spring element, the lever arm being pivotable against a force of the spring element upon the sliding operation of the receiving device.

20. The method according to claim 18, wherein the guide system further includes a mounting portion for mounting the door wing to the carrier, the mounting portion including a counter-abutment configured to block the receiving device in a direction opposite the sliding direction, and the mounting portion being mounted to the carrier after the sliding operation of the receiving device, wherein the counter-abutment of the mounting portion blocks the receiving device in a direction opposite the sliding direction.

21. The method according to claim 18, wherein the guide system further includes a longitudinal rail for displaceably supporting the running carriage, wherein the longitudinal rail is arranged in a direction transverse to the guide rail for guiding the carrier.

* * * * *